Sept. 26, 1961 E. P. MARTIN 3,001,796
RETRACTABLE TRAILER UNDERCARRIAGE
Filed Oct. 8, 1959 5 Sheets-Sheet 1

FIG. I

INVENTOR.
ERNEST P. MARTIN
BY *Ely, Frye & Hamilton*

ATTORNEYS

INVENTOR.
ERNEST P. MARTIN

ATTORNEYS

INVENTOR.
ERNEST P. MARTIN

Sept. 26, 1961 E. P. MARTIN 3,001,796
RETRACTABLE TRAILER UNDERCARRIAGE
Filed Oct. 8, 1959 5 Sheets-Sheet 4

INVENTOR.
ERNEST P. MARTIN
BY Ely, Fryer & Hamilton
ATTORNEYS

Sept. 26, 1961  E. P. MARTIN  3,001,796
RETRACTABLE TRAILER UNDERCARRIAGE
Filed Oct. 8, 1959  5 Sheets-Sheet 5
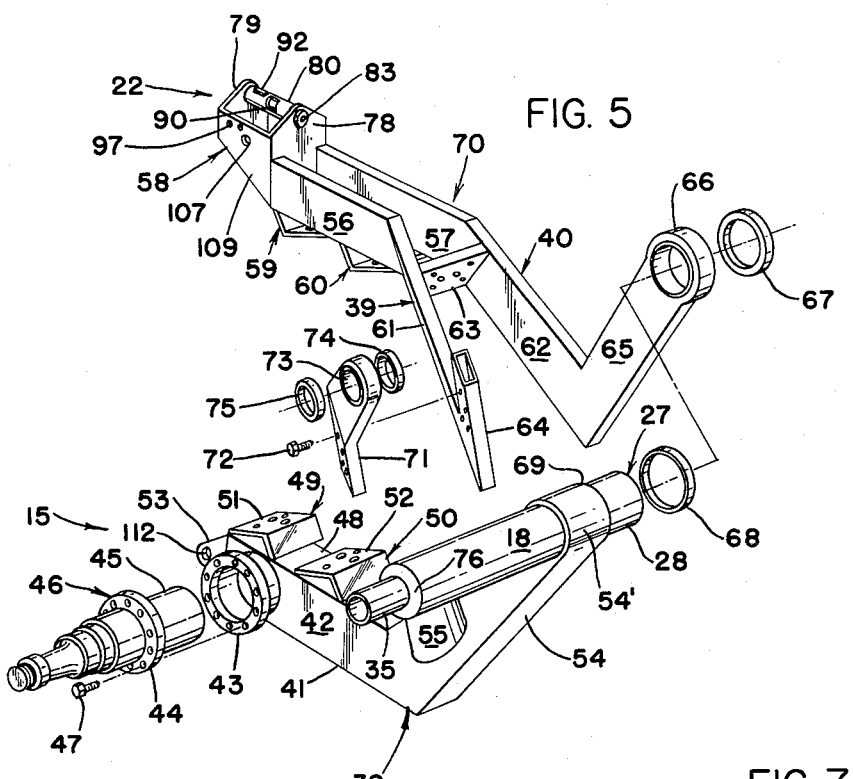
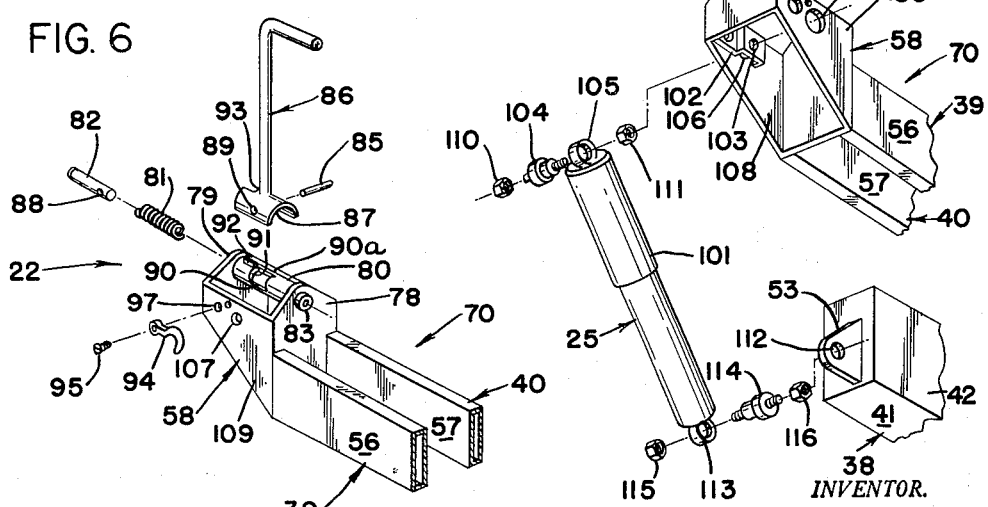
INVENTOR.
ERNEST P. MARTIN
BY Ely, Frye & Hamilton
ATTORNEYS

United States Patent Office 3,001,796
Patented Sept. 26, 1961

3,001,796
RETRACTABLE TRAILER UNDERCARRIAGE
Ernest P. Martin, Wooster, Ohio, assignor to The Gerstenslager Company, Wooster, Ohio, a corporation of Ohio
Filed Oct. 8, 1959, Ser. No. 845,224
9 Claims. (Cl. 280—43.18)

The present invention relates generally to the rear wheel undercarriage assembly used on semi-type trailers and commercial carriers. More particularly, the invention relates to a completely retractable undercarriage that is removable from service without disassembly. More specifically, the undercarriage is constructed so that the running gears are two separate assemblies connected by one common hydraulic system and operated in unison to extend or retract the rear wheel undercarriage assembly.

It is the principal object of the present invention to provide an undercarriage that will function as a conventional type running gear in addition to being retractable, as well as bodily removable.

Another object is to provide a method and apparatus for making semi-trailer type vehicles more compact and readily adaptable to air, sea and rail transportation.

A further object is to provide a retractable undercarriage with variable height adjustments to allow the trailer wheels to serve as trailer bed elevation adjusters during loading and unloading operations.

A still further object of this invention is to provide an undercarriage which accomplishes all of the foregoing objectives with minimum installation, operation, service and maintenance costs.

These and other objects which will become apparent from the following specification are accomplished by the improvements hereinafter described and claimed.

One preferred embodiment of the retractable rear wheel undercarriage is shown by way of example in the accompanying drawings and hereinafter described in detail without attempting to show all of the various forms and modifications in which the invention might be embodied; the invention being measured by the appended claims and not by the details of the specification.

Referring to the drawings:

FIG. 5 is an exploded perspective view of the support arm sub-assembly.

FIG. 6 is an exploded perspective view of the locking sub-assembly.

FIG. 7 is an exploded perspective view of the shock absorber sub-assembly.

Like parts are indicated by like symbols throughout the specification and drawings.

Generally, the present invention consists of two separate and distinct major undercarriage assemblies, each with the ability to retract and completely envelop its own mechanism and wheel assembly without increasing the overall dimensions of the trailer or disturbing its pay load. Both assemblies are mechanically equal and share one common hydraulic system. Therefore, for simplicity only one of the two undercarriage assemblies will be described in the following specification.

Figure 1:
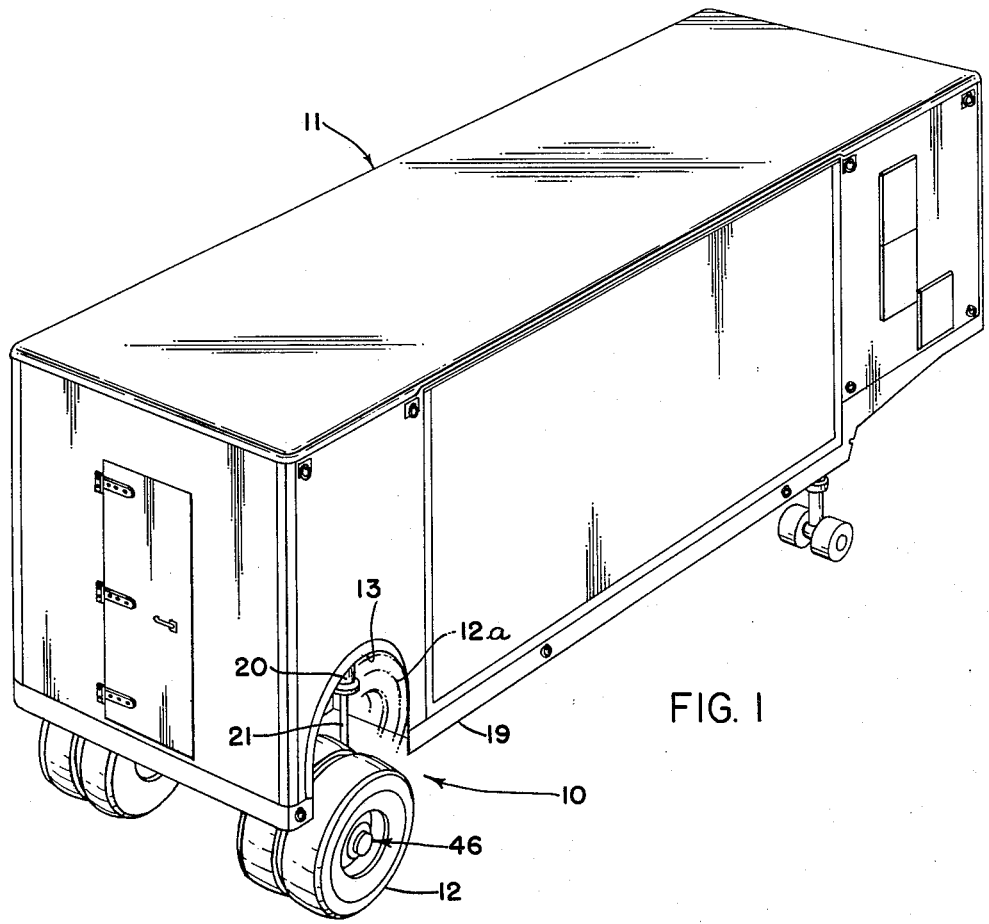
FIG. 1 is a perspective view of a semi-trailer equipped with the improved retractable rear wheel undercarriage.

Referring now to FIG. 1, the right, or curbside, assembly of the retractable rear wheel undercarriage, indicated generally by the numeral 10, is in traveling, or extended, position, and is operably attached to a conventional semi-type trailer 11. To accommodate the complete retraction of the undercarriage assembly 10 and the resultant raising of wheels 12 to a position at 12a, the wheel housing 13 is, of necessity, larger than is conventional. However, no appreciable change is necessary in the trailer body construction.

Figure 2:
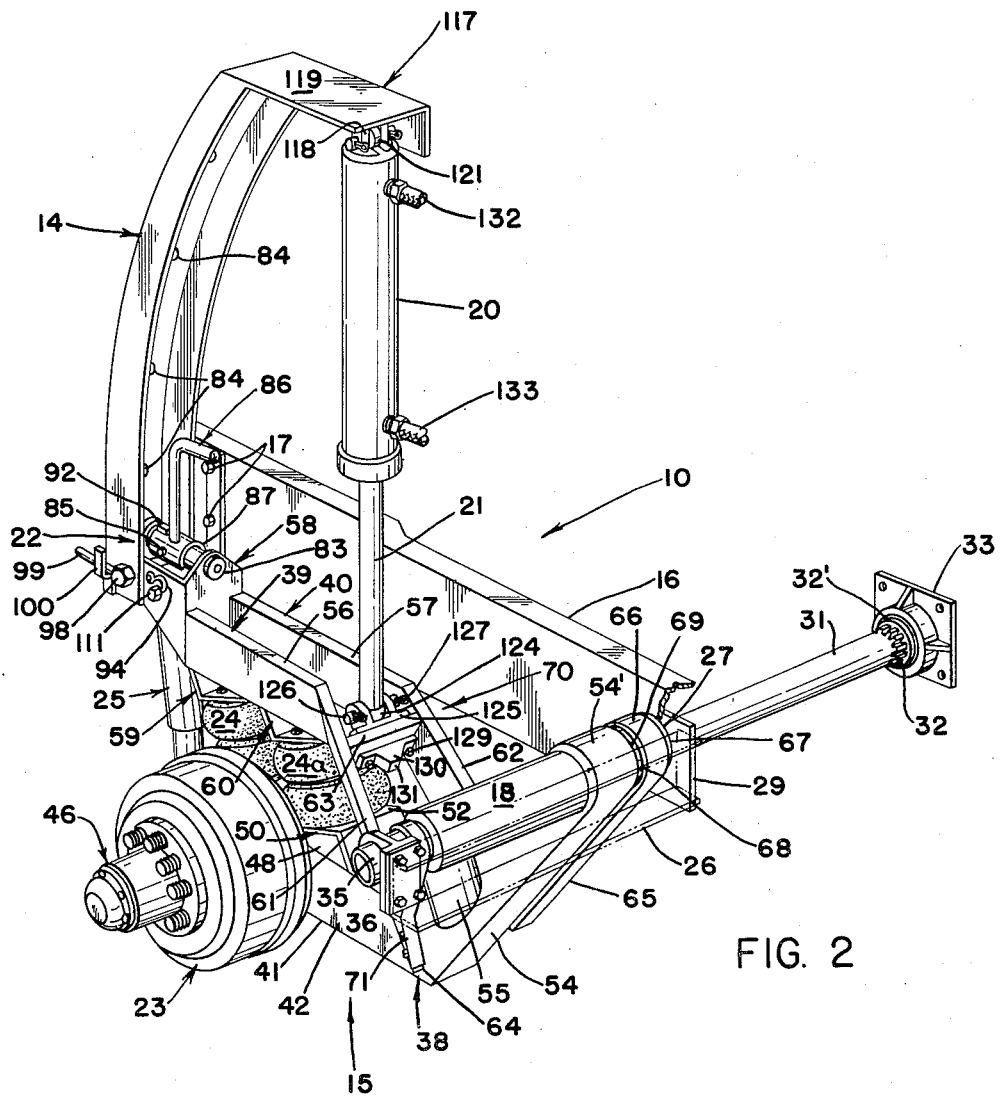
FIG. 2 is a detached perspective view of the right or curbside undercarriage assembly in extended position.

Referring now to FIG. 2, the assembly 10 comprises generally an arcuately circumflexed position locking channel 14 and a running gear sub-assembly 15 connected to trailer frame 16. Channel 14 is fixedly attached to frame 16 as by a plurality of bolts 17. Running gear assembly 15 is rotatably mounted about the axis of pivot tube 18 which lies transversely to the longitudinal axis of the trailer and is disposed between the frame 16 and the outer skirt 19 (FIG. 1). Running assembly 15 is retracted and extended preferably by the operation of a hydraulic system which may be manually or power driven, hereinafter more fully described, through cylinder 20 to actuate plunger rod 21. The assembly 15 is retained in extended, retracted, or selected intermediate positions by means of a locking device 22, also hereinafter more fully described in conjunction with FIG. 6. The running gear assembly 15 provides the connection between the wheel drum 23 and the trailer frame 16 and is disposed parallel to the frame 16. Contained within assembly 15 are air spring assembly units 24 and 24a, and a conventional shock absorber assembly 25.

Figure 4:
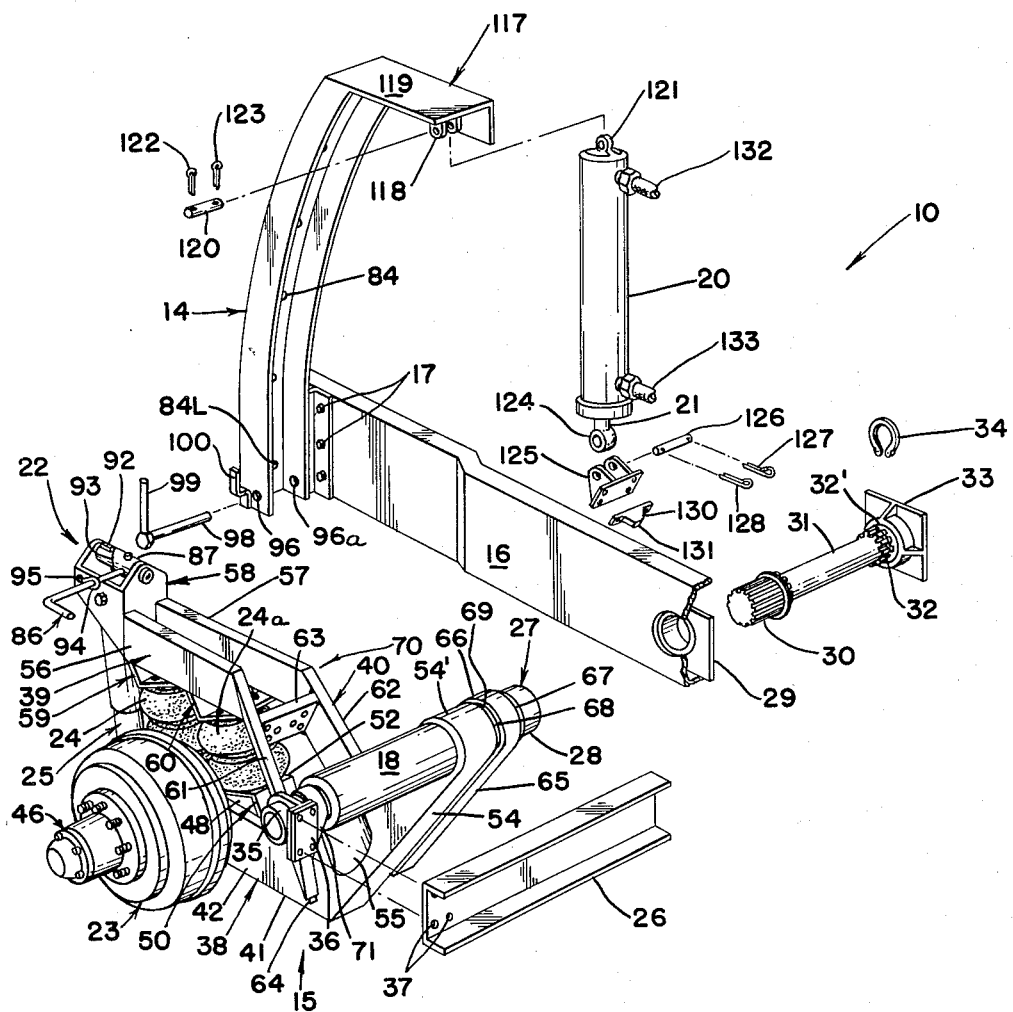
FIG. 4 is an exploded perspective view of the right or curbside assembly showing the running gear sub-assembly removed therefrom as a unit.

Referring now to FIG. 4, the assembly 15 is rotatably attached to frame 16 and frame cross member 26 by pivot tube 18. The laterally interior end 27 of tube 18 is provided with bearing surface 28 which normally protrudes through frame 16 and is supported by bearing plate 29 which is attached to frame 16 by means not shown. The laterally interior end 27 is also internally splined to receive the splined end 30 of stabilizing bar 31. The opposite end 32 of bar 31 has a bearing ring 32' therein which is pivotally and detachably mounted in pivot anchor base 33 as by retaining ring 34. Base 33 is attached to an intermediate frame member (not shown) and via bar 31 contributes to the lateral structural rigidity necessary for pivot bar 18, while still allowing rotation of the bar 31 and tube 18 induced by unevenness of the road or the extension and retraction of the wheels. The laterally outer end of bar 18 is provided with bearing surface 35 and is supported by bearing block 36. Block 36 is mounted on frame cross member 26 as by bolting through holes 37.

Referring now to FIG. 5, the assembly 15 comprises principally an axle support arm 38 and suspension support arms 39 and 40, respectively.

The axle support arm 38 is preferably of tubular design and lies parallel to the trailer frame 16 (FIG. 2). The rear portion 41 of arm 38 is substantially horizontal when the wheels are extended to running position (FIG. 2). The laterally outer surface 42 near the trailing end of rear portion 41 is equipped with a flanged housing tube 43 to accommodate the axle flange 44 and modified axle tube 45 of the hub spindle assembly 46. The hub assembly 46 is attached to axle support arm 38 as by a plurality of cap bolts 47 connecting flange 44 to flanged tube 43.

Located on the upper surface 48 of section 41 are attaching plates 49 and 50. The profiles of plates 49 and 50 are generally wedge shaped with the air spring assembly units 24 and 24a (FIG. 2) being attached to the angularly rearwardly inclined surfaces 51 and 52 of plates 49 and 50, respectively, in a well-known manner.

The trailing end of portion 41 terminates in shock absorber connecting lug 53, as described in connection with FIG. 6.

The forward section 54 of arm 38 is angularly disposed between the horizontal portion 41 and the pivot tube 18, and terminates in a tubular section 54' which mounts pivot tube 18. A knee brace 55 connects between the laterally outermost portion of tube 18 and the lower laterally outer surface of section 54 to give lateral stability to axle support arm 38.

Suspension support arms 39 and 40 are also preferably of tubular construction and are disposed to form a modified A-frame. The rear sections 56 and 57 of arms 39 and 40, respectively, are longitudinally parallel and, when the assembly is in extended or running position, are substantially horizontal. The trailing ends of sections 56 and 57 terminate in housing 58 which contains the locking device, described in conjunction with FIG. 5, and the shock absorber mounting, described in conjunction with FIG. 6.

Air spring attaching plates 59 and 60 are affixed to the lower sides of sections 56 and 57 and are similarly wedge shaped and so placed as to cooperate with their corresponding attaching plates 49 and 50 on axle support arm 38 to mount air spring units 24 and 24a (FIG. 2).

The medial sections 61 and 62 of arms 39 and 40, respectively, are directed angularly downwardly and divergently to form the legs of the A-frame construction. A lateral cross brace 63 connects between sections 61 and 62 near their upper limits. From the lower ends of sections 61 and 62 the tubular structure angles upwardly in a direction approximately 90° from the direction of sections 61 and 62, and still divergently in what are designated sections 64 and 65 of arms 39 and 40, respectively. The leading end of section 65 forms a bearing hub 66 which is rotatably secured about bearing surface 28 of tube 18. Spacer rings 67 and 68 confine hub 66 laterally by abutting against frame 16 (FIG. 3) and shoulder 69 on pivot tube 18, respectively. To facilitate installation and removal of the suspension support assembly 70, comprising the arms 39 and 40 and the parts attached thereto, the leading end of section 64 is provided with a detachable hub connecting plate 71, which is so connected to section 64 as by a plurality of cap screws 72. The bearing surface 73 within plate 71 is rotatably positioned around bearing surface 35 of tube 18. Spacer rings 74 and 75 lend lateral support to the bearing connection by abutting shoulder 76 of tube 18 and bearing block 36, respectively.

The angularly downward disposition of sections 61 and 64 of arm 39 and the angularly upward disposition of sections 62 and 65 of arm 40 forms a depression in the general profile of assembly 70 which allows for clearance between the structure of the trailer body and the undercarriage assembly 15 (FIG. 2) when it has been fully retracted.

Referring now to FIG. 6, the locking mechanism 22 is located in the upper portion of housing 58 at the trailing ends of sections 56 and 57 of arms 39 and 40, respectively. The locking mechanism 22 serves to arrest the rotation of the undercarriage—specifically, the support assembly 70 (FIG. 5)—by securing the trailing end of said assembly 15 to the arcuate guide channel 14 (FIG. 2).

Figure 3:
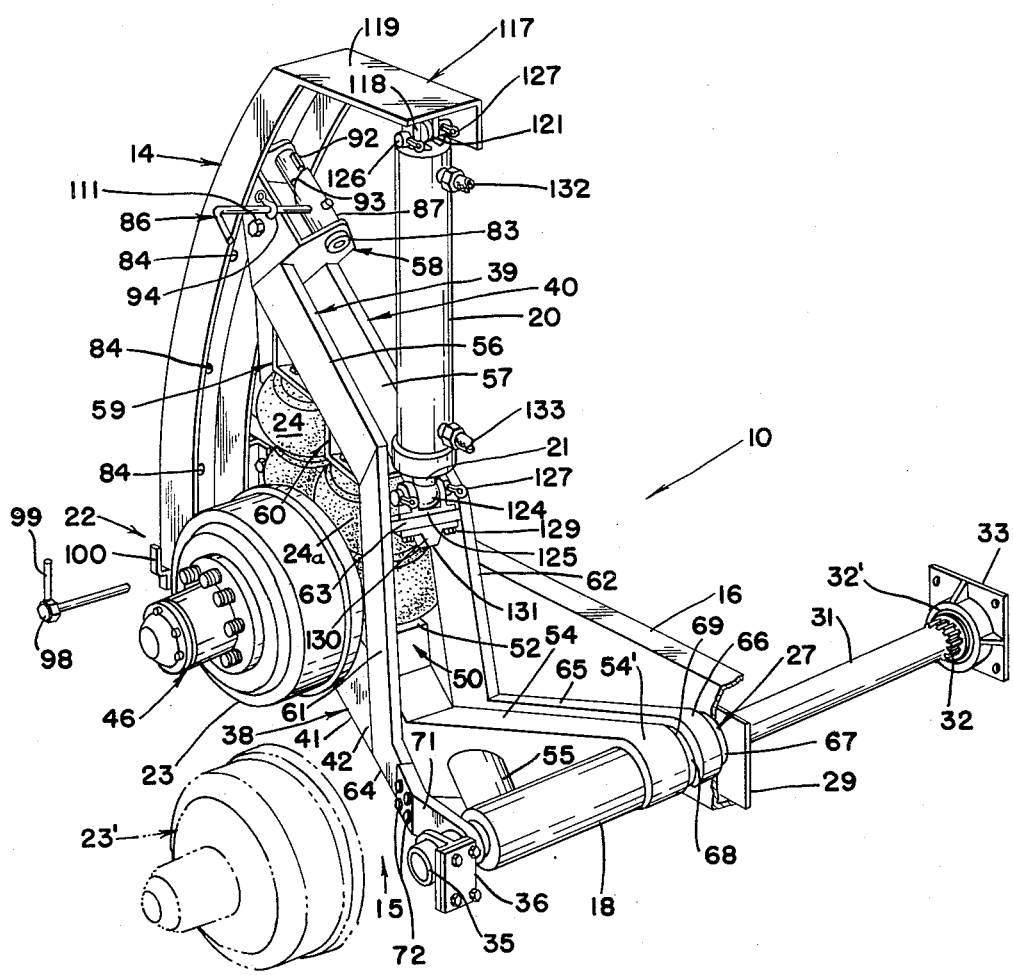
FIG. 3 is a similar view showing the undercarriage assembly in retracted position.

Fixedly positioned between the end walls 78 and 79 of housing 58 is a sleeve 80. Within sleeve 80 is inserted a spring 87 and lock bolt 82. The spring 81 exerts constant pressure between bolt 82 and plug 83 which results in a continual propensity of bolt 82 to move rearwardly from the sleeve 80. However, this rearward movement of bolt 82 is confined to permit the end of bolt 82 to protrude beyond the rear wall 79 only sufficiently far to engage any one of a series of holes 84 arranged at desired intervals in the web of guide channel 14 (see FIG. 2) to assure retention of the undercarriage assembly 15 (FIG. 2) at any of the selected positions. This permits selection of the working height of the trailer bed for loading and unloading purposes and also provides a locking means to secure the undercarriage 15 in fully extended position as shown in FIG. 2, or in fully retracted position as shown in FIG. 3, wherein the wheel drum 23 has been retracted from its running position indicated at 23'.

The bolt 82 is prevented from completely escaping sleeve 80 by retaining pin 85 which interconnects bolt 82 and lock bolt handle 86 through registering holes 88 and 89, respectively. The base 87 of handle 86 is a semi-cylindrical shell and of such a diameter that it fits over the outer surface of sleeve 80.

The pin 85 passes through sleeve 80 via the opposed rectilinear openings 90 and 90a. The rearmost wall 91 of opening 90 or 90a acts as a stop by restraining pin 85 from further rearward movement and thereby limits the distance that pin 82 protrudes beyond rear wall 79.

Located on the top of the outer surface of sleeve 80 is a rib 92. As handle 86 is operated by rotating it from its vertical position parallel to the vertical web of frame 16 to a horizontal position perpendicular to its original position, rib 92 interacts with cam surface 93 (FIG. 4) on the rearward end of the semi-cylindrical base 87 of handle 86. This interaction causes the handle 86 and adjoined bolt 82 to move forward on the axis of sleeve 80. The rib 92 is placed sufficiently forward and the pitch of the cam is such that the 90° rotation of handle 86 retracts the bolt 82 into sleeve 80 sufficiently to unlock the suspension support assembly 70 from the guide channel 14 (FIG. 2). A retaining hook 94 is provided on the outermost surface of housing 58 to secure the handle 86 from assuming the "locked" position by the action of spring 81 when such is not so desired. Hook 94 may be mounted on housing 58 as by a cap screw 95. The "unlocked" position of locking assembly 22 is best seen in FIG. 3.

Referring again to FIG. 4, an additional device is provided for securing the undercarriage in the fully extended or running position. When the undercarriage is in the extended position the bolt 82 is secured in hole 84L. Also, in this position, holes 96 and 96a in locking channel 14 register with the holes 97 in housing 58. Securing pin 98 additionally locks the undercarriage by being positioned through these registering holes. A handle 99 perpendicular to the axis of pin 98 is affixed to pin 98. When pin 98 is in operative position, handle 99 is secured by spring clamp 100 to prevent the pin 98 from jiggling out of its position (FIG. 2).

Referring now to FIG. 7, a conventional shock absorber unit 101 is attached between the suspension assembly 70 and the axle support assembly 38. An offset attaching plate 102 is affixed to the interior side surface of housing 58 and is supplied with a hole 103 through which a standard stud connector 104 connects the hub connector 105 of shock absorber 101. In axial alignment with hole 103 are work ports 106 and 107 through sides 108 and 109, respectively, of housing 58 to permit tightening of nuts 110 and 111 on stud 104, respectively. By this arrangement the shock absorber unit 101 is attached to suspension assembly 70.

The shock unit 101 is attached to the axle support assembly 38 through hole 112 in lug 53 on arm portion 41 and connector hub 113 on shock unit 101. A conventional stud 114 with nuts 115 and 116 are used as the attaching means.

Referring again to FIGS. 2 and 4, the hydraulic cylinder 20 is seen to be disposed substantially vertically. The upper end portion 117 of arcuate guide channel 14 lies horizontally and, having one leg of the channel removed, has the cross-section of a structural angle. A clevis 118 is attached to the underside of the horizontal leg 119 of portion 117, which leg corresponds to and is a continuation of the web of channel 14. A clevis pin 120 attaches the hub connector 121 on cylinder 20 to the clevis 118. The pin 120 is retained by suitable means as, for example, by cotter pins 122 and 123. The hub connector 124 on the lower end of plunger rod 21 is connected to mounting bracket 125 by pin 126 which is secured in operative position by suitable means such as cotter pins 127 and 128. Bracket 125 is mounted on the upper side of cross brace 63, being affixed thereto by a plurality of bolts 129 which also engage bumper 130 to the lower side of brace 63.

The bumper 130 provides a definite limit stop to the amount of upward movement axle support arm 38 can make with respect to the support assembly 70 by providing a surface 131 to contact the nearest portion of section 54 of axle support arm 38. By the use of bumper 130 injury to air spring units 24 and 24a is avoided should a condition arise which would tend to force arm 38 to close against support assembly 70.

Hydraulic cylinder 20 is provided with conventional hydraulic lines and fittings 132 and 133 through which the regulated fluid pressure from suitable means, not shown, may operate the plunger rod 21. When the undercarriage is in fully extended or running position, the plunger 21 is fully extended from cylinder 20. In any of the retracted positions the plunger 21 is retracted accordingly.

Complex valving of the hydraulic system is not required. Although hydraulic pressure is required to extend the running gear assembly 15, the retracting process does not require hydraulic pressure. The retracting process may be accomplished by controlling the release of the hydraulic pressure with the same valves used in the extending operation.

Referring to FIG. 2, the construction of assembly 15 permits easy bodily removal. To accomplish the removal, plunger rod 21 is first disconnected from cross brace 63. Handle 86 is rotated to retract locking bolt 82 (as shown in FIG. 3), and is secured by hook 94. Securing pin 98 is removed and bearing block 36 is detached from the frame. The assembly 15 is then manipulated to clear guide channel 14 and to disengage from bearing plate 29, thus effecting the bodily removal of assembly 15 as the unit shown in FIG. 4.

In view of the above specification, it should be apparent that the separate assemblies comprising the running gear, while performing as a conventional type running gear, afford the additional features which are the subject of the improvements herein disclosed. The ability to retract the gear partially permits elevation adjustments to facilitate loading and unloading, while the ability to retract the gear fully provides a space saving characteristic so necessary to economical air, sea and rail transportation. And even with the mechanism necessary to accomplish the retraction and extension, the assembly is so constructed that installation, maintenance and removal is easy and inexpensive.

What is claimed is:

1. In combination with a semi-type trailer having a frame, a retractable rear wheel undercarriage comprising, individual running gear assemblies each having an axle support sub-assembly and a suspension support sub-assembly pivoted at one end on said frame to form said running gear assembly, cushioning means for interconnecting said sub-assemblies, an arcuately circumflexed guide channel fixedly mounted to said frame, locking means on each of said suspension support sub-assemblies for interconnecting the suspension support sub-assembly with its cooperating guide channel in selected positions, and means for extending and retracting said running gear assembly.

2. In combination with a semi-type trailer having a frame, a retractable rear wheel undercarriage comprising, individual running gear assemblies each having an axle support sub-assembly and a suspension support sub-assembly pivoted at one end on said frame to form said running gear assembly, an arcuately circumflexed guide channel fixedly mounted to said frame, locking means on each of said suspension support sub-assemblies for interconnecting the suspension support sub-assembly with its cooperating guide channel in selected positions cushioning means between the opposite ends of said axle support sub-assembly and said suspension sub-assembly, and means for extending and retracting said running gear assembly.

3. In combination with a semi-type trailer having a frame, a retractable rear wheel undercarriage comprising, longitudinally disposed axle support and suspension support sub-assemblies, a transverse pivot tube at one end of said axle support assembly, said suspension support sub-assembly pivotally mounted at one end on said pivot tube, said pivot tube rotatably mounted on said frame, motion dampening means interconnecting said axle support sub-assembly and said suspension support sub-assembly, an arcuately circumflexed guide channel fixedly mounted to said frame, locking means interconnecting the opposite end of said suspension support sub-assembly with its cooperating guide channel in selected position, and means for extending and retracting said running gear assembly.

4. In combination with a semi-type trailer having a frame, a retractable rear wheel undercarriage comprising longitudinally disposed axle support and suspension support sub-assemblies, said axle support sub-assembly and said suspension support sub-assembly pivotally mounted at one end on said frame, cushioning means for interconnecting said sub-assemblies, an arcuately circumflexed guide channel fixedly mounted to said frame, holes spaced at intervals in the web of said channel, a retractable locking bolt mounted on the opposite end of the suspension support sub-assembly, said bolt registrable with the holes in said guide channel for locking the running gear assembly in extended, retracted or selected intermediate positions, and means for extending or retracting said running gear assembly.

5. In combination with a semi-type trailer having a frame, a retractable rear wheel undercarriage comprising, longitudinally disposed axle support and suspension support sub-assemblies, a transverse pivot tube at one end of said axle support assembly, a wheel spindle assembly mounted laterally of said axle support assembly, said suspension support means mounted at one end on said pivot tube, said pivot tube rotatably mounted on said frame, motion dampening means interconnecting said axle support assembly and said suspension support assembly, an arcuately circumflexed guide channel fixedly mounted on said frame, holes spaced at intervals along the web of said channel, a spring-actuated self-locking bolt mounted on the end of the suspension support opposite from said pivot tube, said bolt interacting with the holes in said guide channel for locking the running gear assembly in extended, retracted, or selected intermediate positions, an additional locking pin for locking the running gear assembly in extended position, and means for extending or retracting said running gear assembly.

6. In combination with a semi-type trailer having a frame, a retractable rear wheel undercarriage comprising, individual running gear assemblies, longitudinally disposed axle support and suspension support sub-assemblies composing each of said running gear assemblies, a transverse pivot tube at one end of each said axle support assembly, said suspension support sub-assembly mounted at one end on said pivot tube, said pivot tube rotatably mounted to said frame, a stabilizer bar, one end of said stabilizer bar engaging the interior end of said pivot tube, the other end of said stabilizer bar pivotally secured to the frame, motion dampening means interconnecting said axle support sub-assembly and suspension support sub-assembly, an arcuately circumflexed guide channel fixedly mounted on said frame, holes spaced apart along the web of said channel, a locking bolt mounted on the end of the suspension support assembly opposite from said pivot tube interacting with the holes in said guide channel for locking the running gear assembly in extended, retracted, or selected intermediate positions, and means for extending or retracting said running gear assembly.

7. In combination with a semi-type trailer having a frame, a retractable rear wheel undercarriage comprising individual running gear assemblies, longitudinally disposed interconnected axle support and suspension support sub-assemblies composing each of said running gear assemblies, a transverse pivot tube at one end of said axle support assembly, said suspension support sub-assembly mounted at one end on said pivot tube, said pivot tube rotatably mounted to said frame, a stabilizer bar, one end of said stabilizer bar engaging the interior end of said pivot tube, the other end of said stabilizer bar pivotally secured to the frame, a shock absorber unit and an air spring assembly interconnecting said axle support sub-assembly and suspension support sub-assembly, an arcuately circumflexed guide channel fixedly mounted on said frame, holes spaced apart along the web of said channel, a locking bolt mounted on the end of the suspension support assembly opposite from said pivot tube for interacting with the holes in said guide channel to lock the running gear assembly in extended, retracted or selected intermediate positions, and means for extending or retracting said running gear assembly.

8. In combination with a semi-type trailer having a longitudinally extending frame, an arcuate guide member rising from the rear end of said frame, a transverse pivot tube spaced forwardly of said guide member and pivotally mounted on said frame, cushionably interconnected axle support and suspension sub-assemblies extending rearwardly from said pivot tube, expansible means connected to the upper end of said guide channel to swing said sub-assemblies downwardly about the axis of said pivot tube, and detachable locking means cooperating between said guide member and the rear end of said suspension sub-assembly to lock said sub-assembly selectively at predetermined elevations.

9. In combination with a semi-type trailer having a longitudinally extending frame, an arcuate guide member rising from the rear end of said frame, a transverse pivot tube spaced forwardly of said guide member and pivotally mounted on said frame, an axle support sub-assembly extending rearwardly from said pivot tube, a suspension sub-assembly pivoted at its front end on said pivot tube and extending rearwardly therefrom over said axle support sub-assembly, expansible means connected to the upper end of said guide channel to swing said suspension sub-assembly downwardly about the axis of said tube, cushioning means connected between the axle support and suspension sub-assemblies, and detachable locking means cooperating between said guide member and the rear end of said suspension sub-assembly to lock said suspension sub-assembly selectively at predetermined elevations.

References Cited in the file of this patent

UNITED STATES PATENTS

| | | |
|---|---|---|
| 393,707 | Kerns | Nov. 27, 1888 |
| 2,227,762 | Ronning | Jan. 7, 1941 |
| 2,452,267 | Schramm | Oct. 26, 1948 |
| 2,576,824 | Bush | Nov. 27, 1951 |
| 2,740,639 | Eckroad | Apr. 3, 1956 |
| 2,781,529 | Moody | Feb. 19, 1957 |
| 2,788,908 | Lynd | Apr. 16, 1957 |
| 2,937,775 | Funk | May 24, 1960 |